Dec. 31, 1946.    E. A. NEFF    2,413,368
PARACHUTE PACK OPENING DEVICE
Filed Sept. 14, 1944
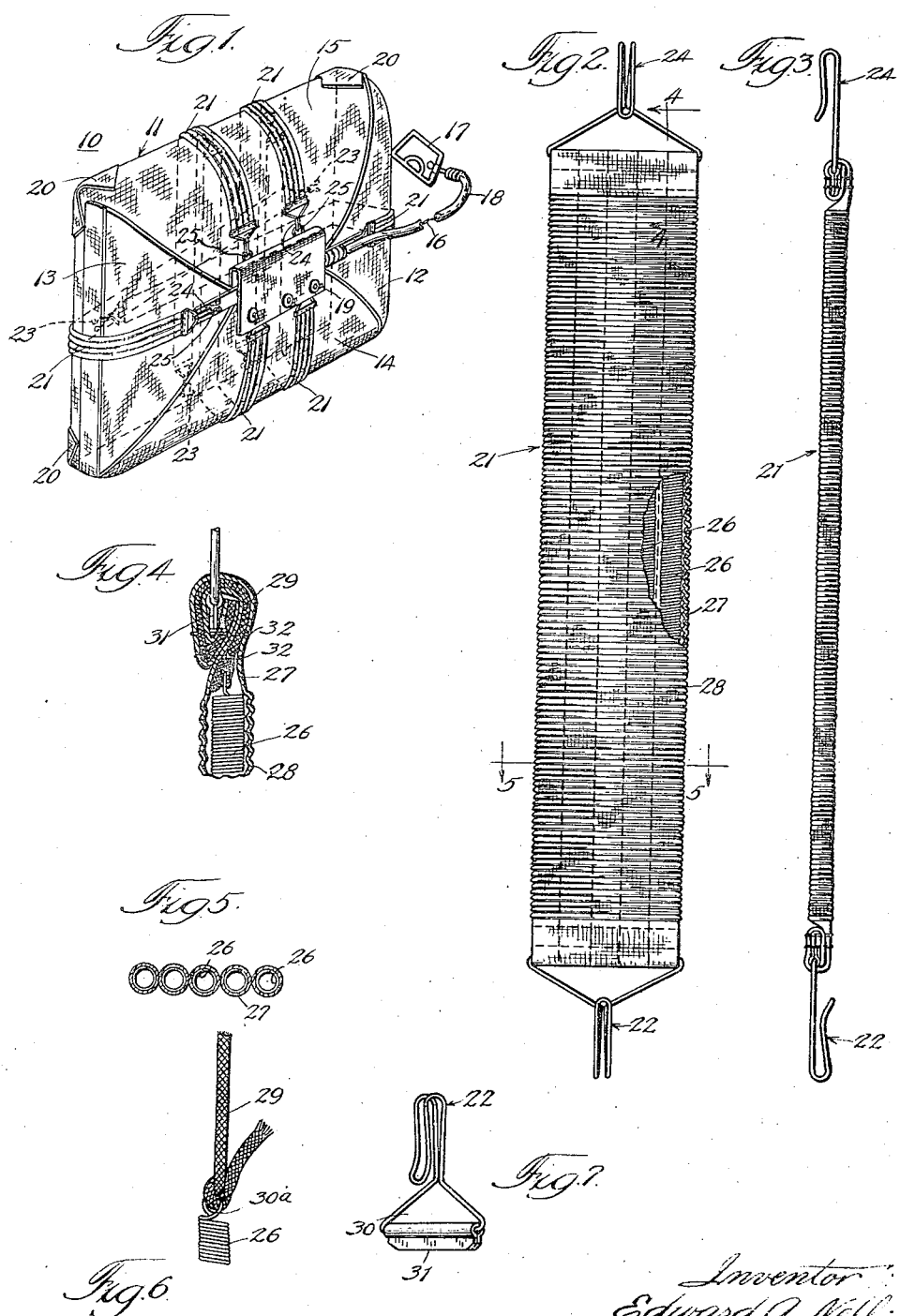
Inventor
Edward A. Neff
By Thiess, Olsen & Mecklenburger
Attys Patented Dec. 31, 1946

2,413,368

UNITED STATES PATENT OFFICE 2,413,368

PARACHUTE PACK OPENING DEVICE

Edward A. Neff, Chicago, Ill.

Application September 14, 1944, Serial No. 554,010

5 Claims. (Cl. 244—149)

1

This invention relates to manually operated parachute packs and means for opening parachute packs when the rip cord of the parachute is pulled. More particularly, it relates to such parachute packs and opening means which will function at low temperatures, and it is an object of the invention to provide improved parachute packs and opening means therefor of the character indicated.

Parachutes are used as safety devices for aviators such as pilots, navigators, and other members of an airplane crew, to be used to lower the user to the ground in the event of an air mishap. The parachute is also used as a means for delivering materiel and personnel at desired points with great speed. The characterizing feature of its use in all applications is the extreme dependability it must have; it need fail to operate only once in order to destroy the user. The nature of its use, the falling through free space at exceedingly high velocities, leaves very little if any time to investigate the reason for and to correct any difficulty which may exist. Therefore, in order to make use of the parachute effectively and to insure utter dependability, all parts of it are made in the best possible manner, utilizing the highest skill available.

Parachutes are placed in containers which are worn by the users in some convenient position, such for example, as a seat cushion. The container is made of canvas or the like, and is provided with large flaps which close the container, the flaps being held closed by the rip cord and in order to open the container completely when the rip cord is pulled, well known parachute containers have rubber bands under tension secured to the ends of the flaps so that when the rip cord is pulled releasing the flaps the rubber bands contract, thereby pulling the flaps open without any delay, and allowing the parachute to open as quickly as possible.

At low temperatures such as may be encountered in the colder regions of the earth and at high altitudes, where the temperature may approximate 50° below zero Fahrenheit, rubber loses its resiliency or elasticity. In fact, the rubber freezes and becomes rigid, losing even its pliability. Parachute containers equipped with elastic bands are therefore rendered useless under these conditions, since the elastic bands would not only not open the container, but would actually tend to hold it closed. Accordingly it is a further object of the invention to provide means for opening a parachute container which will not

2 lose their elasticity under conditions of low temperature.

It is a further object of the invention to provide parachute packs that are efficient, simple, and have increased dependability.

It is a further object of the invention to provide a parachute pack which will function under all conditions of temperature.

In carrying out the invention in one form, a container adapted to hold a parachute is provided with flaps for closing the container. Means including a series of tension members for opening the flaps are arranged on the container, each of the series of tension members including a plurality of springs enclosed in a protective covering.

For a more complete understanding of the invention, reference should be had to the accompanying drawing in which:

Fig. 1 is a perspective view of a parachute pack embodying the invention;

Fig. 2 is an enlarged plan view, partially broken away, of one tension member shown in Fig. 1;

Fig. 3 is an edge view of the tension member of Fig. 2;

Fig. 4 is an enlarged sectional view taken substantially along line 4—4 of Fig. 2;

Fig. 5 is a sectional view taken substantially along line 5—5 of Fig. 2;

Fig. 6 is an enlarged view of a portion of a tension member; and

Fig. 7 is a perspective view of a hook for attaching the tension member to the pack.

Referring to the drawing, the invention is shown embodied in a parachute pack 10 comprising a container which may be made from canvas, or other suitable material, placed around a semi-rigid framework to give a structure having a generally rectangular base 11 and flaps 12, 13, 14 and 15 forming the sides of the pack and being arranged to fold over a parachute within the pack to form a completed pack. The ends of the flaps 12—15 are brought together, as shown, and are held closed by the rip cord 16 which is attached to the ring 17, the rip cord being placed in a flexible tube 18 to prevent interference with the operation of the rip cord and a flap 19 forming part of the pack is placed so as to cover the connection of the rip cord and the ends of the flaps 12—15 to protect the opening mechanism. Reinforcing members 20 may be placed at the corners of the pack for strengthening purposes.

When it is desired to open the parachute, the user pulls on the ring 17, thereby releasing the ends of the flaps 12—15, and to insure that the flaps will open immediately and completely, tension members 21 are provided. Although, in the illustrated embodiment, six tension members are shown, two each being fastened to the flaps 14 and 15 and one each being fastened to the flaps 12 and 13, more or less may be used without departing from the scope of the invention. The tension members are fastened at one end to the rear side of the container by means of hooks 22 which hook into cooperating eyes 23 attached to the material of the container in any well known manner such, for example, as by sewing, and are stretched around the pack to place them under tension, the remaining ends being fastened to the various flaps 12—15, also by means of hooks 24 and eyes 25, which are fastened to the flaps as previously described for eyes 23.

The expanding field of flight includes the polar regions and regions of high altitude where extremely low temperatures are encountered. To eliminate the possibility of failure of the parachute at low temperatures due to the fact that the tension members may not open the pack when the rip cord is pulled, it is an important feature of the invention to provide tension members which will function under all conditions of temperature. The tension members 21 consist of a plurality of springs 26, the number of which may be varied to provide the necessary tensile force and a protective covering 27 for the springs, the protective covering being made of cloth, leather or other suitable material and being in the form of a tube having a separate compartment for each spring as shown, the compartments being formed by stitching or weaving, or by other well known methods. In this manner each spring is prevented from interfering with the adjacent spring and the springs will not tend to catch on outside objects such as the aviator's suit or the material of the parachute pack.

The protective covering 27 is considerably longer than the normal free length of the springs and is gathered into folds 28 which lengthen out when the springs are elongated. Strains on the covering and the joints between the springs and the covering are thereby prevented, it being desirable that the springs may elongate one hundred percent of the original length so that the tension members will have the necessary strength and yet be easy to manipulate.

Hooks 22 and 24 are provided for fastening the tension members to the parachute container, each hook being fastened to one end of a spring 26 by means of a woven tape 29, which is threaded through an eye 30a on the spring 26, the free ends of the tape which are inside of the compartment for the particular spring being threaded through the eye 30 of the hook along with the covering 27, folded under a metallic tab 31 forming part of the hook and stitched by the stitches 32 to the covering (see Fig. 4). For fastening the tape 29 to the spring 26, the tape may be braided in two portions, as shown, and one end inserted through the loop so formed (Fig. 6). This method of joining the springs 26 to the hooks 22 and 24 and to the covering 27 is simple and lends itself to ordinary manufacturing processes without requiring special machines.

The springs are made of steel, which is unaffected by changes in temperature so far as elasticity and resiliency is concerned, and the protective covering assures that the springs are in condition for use at all times and thus, when the parachute jumper pulls the rip cord, the parachute pack flaps will be pulled back and the parachute will open.

While a particular embodiment of the invention has been shown, it will be understood, of course, that the invention is not limited thereto since many modifications may be made, and it is, therefore, contemplated by the appended claims to cover any such modifications as come within the true spirit and scope of the invention.

Having thus described the invention, what is claimed and desired to secure by Letters Patent is:

1. In combination a container adapted to hold a parachute, said container having flaps for closing said container, a plurality of tension members provided with means attaching the tension members to said container and flaps for opening said container, said tension members including a plurality of springs enclosed in a protective covering, said attaching means being provided with a loop, tape means attached to each end of each spring, the tape and the covering being threaded through said loop on said attaching means and fastened to the covering thereby attaching said springs to said attaching means.

2. In combination a container adapted to hold a parachute, said container being provided with flaps for closing said container, tension members for opening said container, said tension members including metallic springs enclosed in a protective covering, each spring being in a separate compartment of said covering, hooks at each end of said tension members for attaching said tension members to said container, said covering being accumulated between the ends of said springs whereby said springs may elongate without straining said covering, the ends of each spring being provided with a tape, said tape and said covering being threaded through a loop on said hook and stitched to the covering whereby to attach the springs to said hooks.

3. Means for opening a parachute container comprising a plurality of springs in a protective covering, said covering being accumulated between the ends of said springs whereby said springs may elongate without placing strain on said coverings, tape means attached to the ends of each spring and hooks associated with each end of said springs, said tape means and said covering being threaded through a loop on said hook and attached to said covering whereby said springs are attached to said hooks.

4. Means for opening a parachute container comprising a plurality of springs in a protective covering, said covering being accumulated between the ends of said springs whereby said springs may elongate without placing strain on said coverings, hooks associated with each end of said springs, and tape means for attaching said springs to said hooks, individual ones of said tape means including a divided portion whereby said individual tape is threaded through a loop at one end on one of said springs and through the divided portion thereof.

5. Means for opening a parachute container comprising a plurality of springs in a protective covering, said covering being accumulated between the ends of said springs whereby said springs may elongate without placing strain on said coverings, tape means attached to the ends of each spring, and hooks associated with each end of said springs, said tape means and said covering being attached to said hooks.

EDWARD A. NEFF.